United States Patent
Kim et al.

(10) Patent No.: US 11,451,871 B2
(45) Date of Patent: Sep. 20, 2022

(54) ELECTRONIC DEVICE FOR PROVIDING INFORMATION RELATED TO BOOKMARKED CONTENT, AND METHOD FOR CONTROLLING ELECTRONIC DEVICE

(71) Applicant: SAMSUNG ELECTRONICS CO., LTD., Suwon-si (KR)

(72) Inventors: Sang Min Kim, Suwon-si (KR); Song Ah Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/758,562

(22) PCT Filed: Nov. 13, 2018

(86) PCT No.: PCT/KR2018/013775
§ 371 (c)(1),
(2) Date: Apr. 23, 2020

(87) PCT Pub. No.: WO2019/098635
PCT Pub. Date: May 23, 2019

(65) Prior Publication Data
US 2020/0351563 A1      Nov. 5, 2020

(30) Foreign Application Priority Data
Nov. 14, 2017   (KR) .......................... 10-2017-0151796

(51) Int. Cl.
*H04N 5/445*      (2011.01)
*H04N 21/472*     (2011.01)
(Continued)

(52) U.S. Cl.
CPC ..... *H04N 21/47217* (2013.01); *H04N 21/438* (2013.01); *H04N 21/4316* (2013.01);
(Continued)

(58) Field of Classification Search
CPC ............ H04N 21/4722; H04N 21/482; H04N 21/2347; H04N 21/26258; H04N 21/4882; H04N 21/426; H04N 21/47815
(Continued)

(56) References Cited

U.S. PATENT DOCUMENTS 8,122,474 B2 *   2/2012   Tecot ..................... G11B 27/10
                                                              725/80
8,239,574 B2     8/2012   Keum et al.
(Continued)

FOREIGN PATENT DOCUMENTS

KR    10-2006-0062967    6/2006
KR    10-2006-0134428    12/2006
(Continued)

OTHER PUBLICATIONS

International Search Report for PCT/KR2018/013775 dated Feb. 19, 2019, 4 pages.
(Continued)

*Primary Examiner* — Jivka A Rabovianski
(74) *Attorney, Agent, or Firm* — Nixon & Vanderhye, P.C.

(57) ABSTRACT

An electronic device is provided. The electronic device includes a communication interface for communicating with an external device, an input interface for receiving a user input, a memory storing at least one bookmark information about bookmarked contents, an output interface including at least one of a display and a speaker, and a processor electrically connected with the communication interface, the input interface, the memory, and the output interface. In addition, various embodiments identified through the specification are possible.

14 Claims, 11 Drawing Sheets

(51) Int. Cl.
  *H04N 21/431* (2011.01)
  *H04N 21/438* (2011.01)
  *H04N 21/45* (2011.01)
  *H04N 21/4722* (2011.01)
  *H04N 21/482* (2011.01)
  *H04N 21/488* (2011.01)

(52) U.S. Cl.
  CPC ..... *H04N 21/4532* (2013.01); *H04N 21/4722* (2013.01); *H04N 21/4821* (2013.01); *H04N 21/4882* (2013.01)

(58) Field of Classification Search
  USPC .............. 725/41, 51, 110, 52, 55, 60, 61, 93
  See application file for complete search history.

(56) References Cited

U.S. PATENT DOCUMENTS

| | | |
|---|---|---|
| 8,761,392 B2 | 6/2014 | Chen et al. |
| 9,143,717 B2 | 9/2015 | Kim |
| 9,992,035 B2 | 6/2018 | Keum et al. |
| 2005/0229227 A1* | 10/2005 | Rogers ............ H04N 21/47815 725/115 |
| 2007/0150930 A1* | 6/2007 | Koivisto ............ G11B 27/034 725/134 |
| 2008/0104534 A1 | 5/2008 | Park et al. |
| 2012/0030554 A1* | 2/2012 | Toya ................ H04N 21/47214 715/206 |

FOREIGN PATENT DOCUMENTS

| | | |
|---|---|---|
| KR | 10-0689883 | 2/2007 |
| KR | 10-2008-0029088 | 4/2008 |
| KR | 10-2008-0038630 | 5/2008 |
| KR | 10-2009-0072609 | 7/2009 |
| KR | 10-2010-0027644 | 3/2010 |
| KR | 10-2012-0043772 | 5/2012 |
| KR | 10-1466356 | 11/2014 |

OTHER PUBLICATIONS

Written Opinion of the ISA for PCT/KR2018/013775 dated Feb. 19, 2019, 6 pages.

* cited by examiner

ELECTRONIC DEVICE FOR PROVIDING INFORMATION RELATED TO BOOKMARKED CONTENT, AND METHOD FOR CONTROLLING ELECTRONIC DEVICE

CROSS-REFERENCE TO RELATED APPLICATIONS

This application is the U.S. national phase of International Application No. PCT/KR2018/013775 filed 13 Nov. 2018, which designated the U.S. and claims priority to KR Patent Application No. 10-2017-0151796 filed 14 Nov. 2017, the entire contents of each of which are hereby incorporated by reference.

TECHNICAL FIELD

Embodiments disclosed in the disclosure relate to technologies of bookmarking content output from an electronic device.

DESCRIPTION OF RELATED ART

An electronic device including a display and a speaker may output content received from a broadcasting station. A recent display device provides a variety of functions or information in response to a request of a user, as well as unilaterally provides content to the user. In other words, the electronic device may provide a user interaction function to provide a variety of functions or information desired by the user.

With the development of communication technology, the display device may be connected with an external device to receive information desired by the user. Particularly, the display device may be connected with a content provider through a set-top box or the like to provide content desired by the user.

A display device may bookmark output content. When receiving a user input for selecting the bookmarked content, the display device may provide a user with the selected content. When the selected content is not broadcast from a specified channel or is not stored in a memory, it may be difficult for the display device to provide the user with the selected content.

Furthermore, although providing the user with the bookmarked content, the display device may provide the content and only basic information such as a title of the content. It may be difficult for the display device to provide the user with complex information associated with the content.

SUMMARY

Various embodiments of the disclosure are to provide an electronic device capable of providing a user with complex information associated with bookmarked information displayed on an electronic device and a control method of the electronic device.

In accordance with an aspect of the disclosure, an electronic device is provided. The electronic device may include a communication interface configured to communicate with an external device, an input interface configured to receive a user input, a memory storing at least one bookmark information about bookmarked contents, an output interface configured to include at least one of a display and a speaker, and a processor electrically connected with the communication interface, the input interface, the memory, and the output interface. The processor may receive a user input for selecting the at least one bookmark information stored in the memory via the input interface and may output channel information of a channel, broadcasting content corresponding to the received user input, via the output interface.

In accordance with another aspect of the disclosure, a control method of an electronic device is provided. The method may include receiving a user input for selecting at least one of at least one bookmark information about bookmarked content and outputting channel information for broadcasting content corresponding to the received user input via an output interface.

In accordance with another aspect of the disclosure, a computer-readable storage medium is provided. The computer-readable storage medium may store a program for executing a method including receiving a user input for selecting at least one of at least one bookmark information and displaying channel information for broadcasting content corresponding to the received user input on a display.

According to embodiments disclosed in the disclosure, when receiving a user input for selecting bookmarked content, the electronic device may provide a user with channel information of a channel broadcasting selected content and additional information associated with the content as well as provide the user with specified content, thus implementing a service which actively and quickly provides a variety of information desired by the user.

In addition, various effects directly or indirectly ascertained through the disclosure may be provided.

Figure 1:
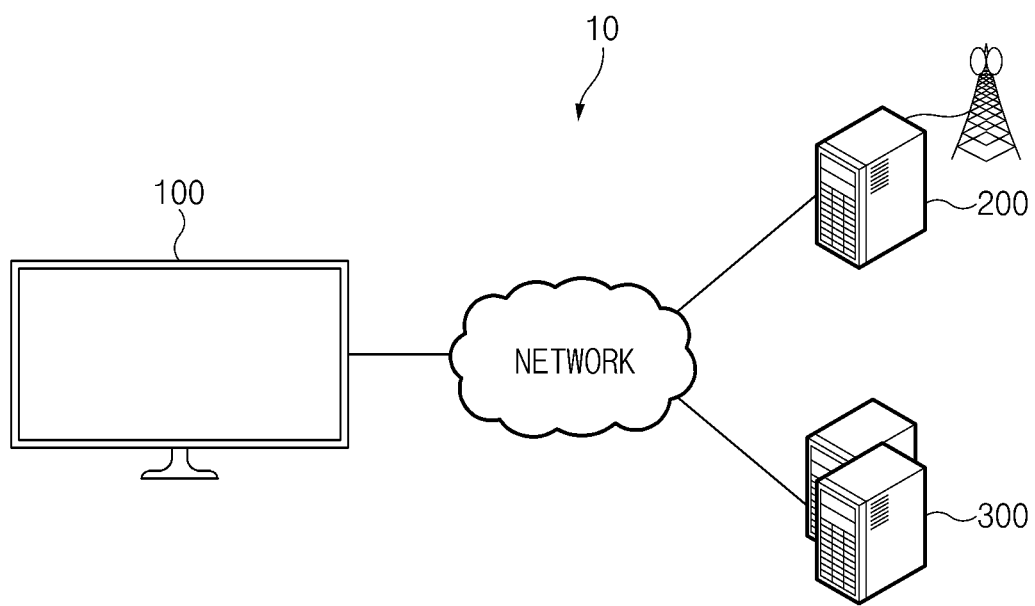
FIG. 1 is a drawing illustrating a bookmark information providing system according to an embodiment.

With regard to description of drawings, the same or similar denotations may be used for the same or similar components.

DETAILED DESCRIPTION OF EXAMPLE EMBODIMENTS

Hereinafter, various embodiments of the disclosure may be described with reference to the accompanying drawings. However, it should be understood that this is not intended to limit the disclosure to specific implementation forms and includes various modifications, equivalents, and/or alternatives of embodiments of the disclosure. With regard to description of drawings, similar components may be marked by similar reference numerals.

FIG. 1 is a drawing illustrating a bookmark information providing system according to an embodiment.

Referring to FIG. 1, a bookmark information providing system 10 may include an electronic device 100, a broadcast service device 200, and an external server 300. The electronic device 100, the broadcast service device 200, and the external server 300 may be connected over a network. For example, the electronic device 100 may be connected with the external server 300 over a communication network and may be connected with the broadcast service 200 over a broadcast network.

According to an embodiment, the electronic device 100 may receive and provide contents from the broadcast service device 200 to a user. According to an embodiment, the electronic device 100 may output at least one of an image and a sound included in the received content. According to an embodiment, the electronic device 100 may be implemented as each of various devices, such as a TV, a desktop, a notebook PC, a smartphone, a tablet PC, a monitor, and an electronic album, each of which is capable of outputting an image and a sound.

According to an embodiment, the broadcast service device (or content transmission device) 200 may transmit content to the electronic device 100. According to an embodiment, the broadcast service device 200 may transmit broadcast information of a plurality of channels and information (e.g., meta information) associated with content together with the content to the electronic device 100. The electronic device 100 may provide information corresponding to a user input using the broadcast information of the plurality of channels and the information associated with the content.

According to an embodiment, the electronic device 100 may bookmark (or register) content (as favorites). For example, the electronic device 100 may receive a user input and may bookmark output content. According to an embodiment, the electronic device 100 may store information (or bookmark information) about the bookmarked content in its memory. According to an embodiment, the electronic device 100 may transmit the stored bookmark information to the external server 300.

According to an embodiment, the external server 300 may receive the bookmark information from the electronic device 100. According to an embodiment, the external server 300 may obtain information associated with content using the received bookmark information. The information associated with the bookmark information may include, for example, channel information of a channel broadcasting content and additional information (e.g., product information, music information, local information, or the like) associated with the content. According to an embodiment, the external server 300 may transmit the additional information to the electronic device 100.

According to an embodiment, when receiving a user input for selecting the stored bookmark information, the electronic device 100 may provide the user with information associated with content corresponding to the selected bookmark information. The information associated with the content may include, for example, channel information of a channel broadcasting the content and additional information associated with the content. According to an embodiment, when receiving the user input, the electronic device 100 may obtain the channel information and the additional information from the external server 300.

Thus, the electronic device 100 may output the channel broadcasting the selected content, depending on a user input, and may provide the user with various services using the information associated with the content.

Figure 2:
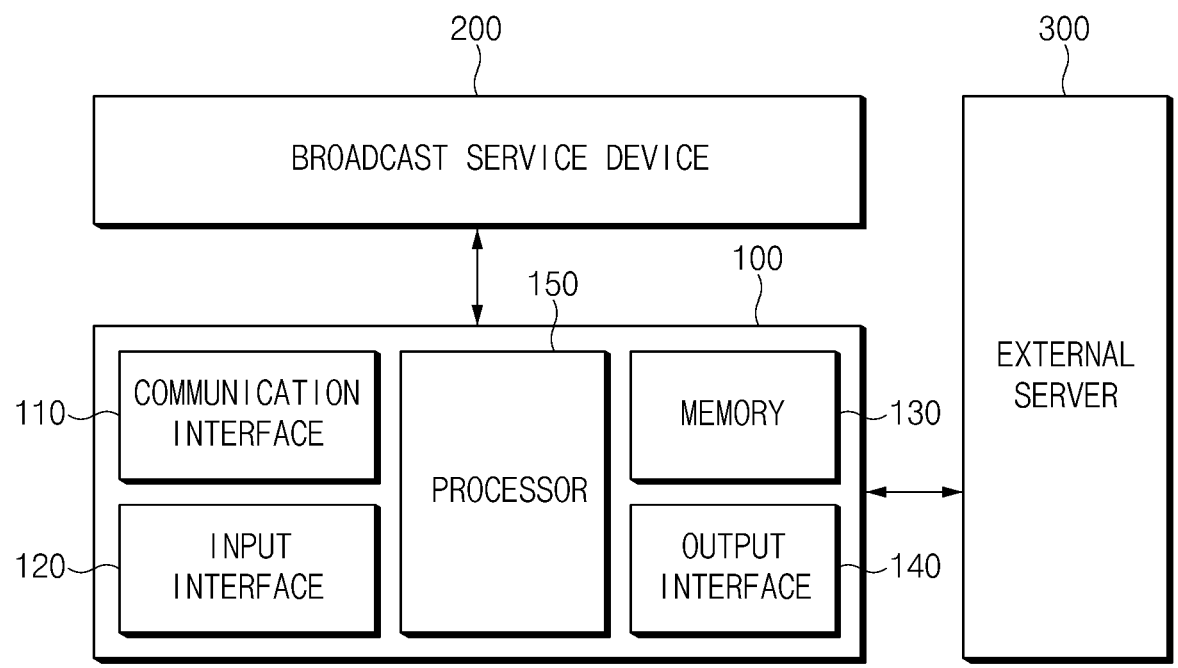
FIG. 2 is a block diagram illustrating a configuration of a display device according to an embodiment.

FIG. 2 is a block diagram illustrating a configuration of a display device according to an embodiment.

Referring to FIG. 2, an electronic device 100 may include a communication interface 110, an input interface 120, a memory 130, an output interface 140, and a processor 150.

According to an embodiment, the communication interface 110 may be connected with an external device to transmit or receive data. In other words, the communication interface 110 may be a configuration for communicating with the external device. The communication interface 110 may be at least one of, for example, a wired interface (e.g., an HDMI interface, a DVI interface, a VGA interface, or the like) and a wireless interface (e.g., a Bluetooth interface, an NFC interface, a Wi-Fi interface, an IR interface, or the like).

According to an embodiment, the input interface 120 may receive a user input for controlling the electronic device 100. For example, the input interface 120 may be connected with an input device, such as a remote controller, a keyboard, or a mouse, via the communication interface 110 to receive a user input. For another example, the input interface 120 may receive a user input via a button or the like directly installed in the electronic device 100.

According to an embodiment, the memory 130 may store at least one bookmark information about bookmarked content. The bookmark information may include, for example, title information of the content, an image included in the content, sound information included in the content, thumbnail information of the content, or the like. According to an embodiment, the memory 130 may store an application program (or an application) for executing a function associated with the bookmark information.

According to an embodiment, the output interface 140 may output content. The output interface 130 may include, for example, a display and a speaker. The display may display an image included in content. The speaker may output a sound included in content.

According to an embodiment, the processor 150 may be electrically connected with the communication interface 110, the input interface 120, the memory 130, and the output interface 140 to control an overall operation of the electronic device 100.

According to an embodiment, the processor 150 may receive content from a broadcast service device 200 via the communication interface 110. According to an embodiment, the processor 150 may output the received content via the output interface 140. For example, the processor 150 may display an image included in content on the display and may output a sound included in the content via the speaker.

According to an embodiment, the processor 150 may receive a user input for bookmarking content via the input interface 120. According to an embodiment, when receiving the user input, the processor 150 may bookmark content output via the output interface 140. According to an embodiment, the processor 150 may store bookmark information associated with the bookmarked content in the memory 130. The bookmark information may be, for example, information (e.g., an image, a sound, or metadata) about content output before or after a specified time with respect to a time when a user input for bookmarking content is received. According to an embodiment, the processor 150 may transmit the bookmark information to an external server 300 via the communication interface 110.

According to an embodiment, the processor 150 may receive a user input for selecting bookmark information stored in the memory 130 via the input interface 120. According to an embodiment, when receiving the user input, the processor 150 may output information associated with selected content via the output interface 140. For example, the processor 150 may output channel information of a channel broadcasting the selected content via the output interface 140. For another example, the processor 150 may output additional information associated with the selected content via the output interface 140. The additional information may include at least one of, for example, information about a service provider capable of providing the content, information about a product and a place included in an image of the content, and information about music included in a sound of the content.

According to an embodiment, the processor 150 may receive channel information of content corresponding to a user input from the external server 300. According to another embodiment, the processor 150 may obtain channel information of content corresponding to a user input using broadcast information of a plurality of channels received from the broadcast service device 200. In other words, although not connected with the external server 300, the processor 150 may obtain the channel information using the broadcast information received together with content from the broadcast service device 200.

According to an embodiment, the processor 150 may receive additional information associated with content from the external server 300. For example, when receiving a user input, the processor 150 may transmit a request to receive the additional information to the external server 300 and may receive the additional information.

According to an embodiment, the external server 300 may obtain additional information using bookmark information received from the electronic device 100. For example, the external server 300 may obtain additional information using information analyzed based on at least one of an image and a sound included in content. For another example, the external server 300 may obtain additional information using information (e.g., meta information) associated with content. The information associated with the content may include, for example, information about a product, place, music, or the like associated with the content. According to an embodiment, the external server 300 may store the obtained additional information in a database. According to an embodiment, the external server 300 may transmit the obtained additional information to the electronic device 100. For example, when receiving a request from the electronic device 100, the external server 300 may transmit the obtained additional information to the electronic device 100.

According to an embodiment, the processor 150 may execute an application stored in the memory 130. The application may be, for example, an application for executing a function associated with bookmark information. According to an embodiment, the processor 150 may receive a user input through the application. For example, the processor 150 may receive a user input for bookmarking output content. For another example, the processor 150 may receive a user input for selecting bookmark information stored in the memory 130. According to an embodiment, the processor 150 may output information associated with content corresponding to selected bookmark information via the output interface 140. For example, the processor 150 may display channel information of a channel broadcasting content corresponding to selected bookmark information on the display. Furthermore, the processor 150 may display additional information associated with selected bookmark information together with the channel information on the display.

Thus, when receiving a user input for selecting bookmarked content, the electronic device 100 may provide a user with channel information and additional information associated with the selected content.

Figure 3:
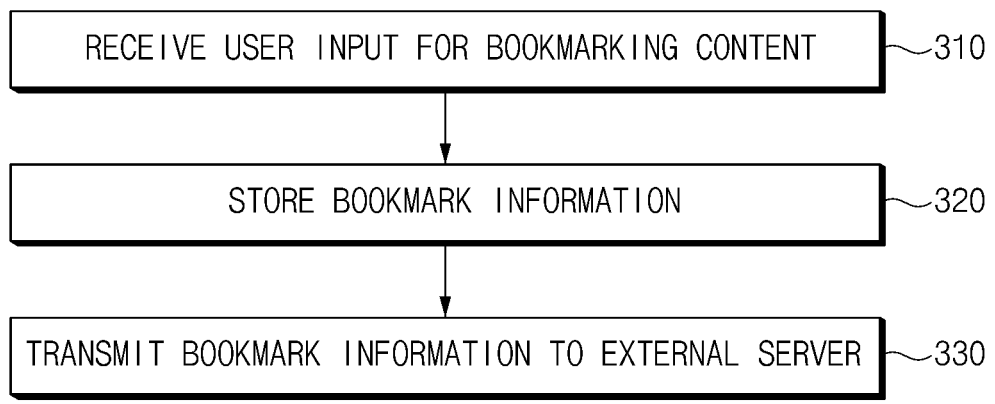
FIG. 3 is a flowchart illustrating a method for generating bookmark information in a display device according to an embodiment.

FIG. 3 is a flowchart illustrating a method for generating bookmark information in a display device according to an embodiment.

Referring to FIG. 3, an electronic device 100 may receive a user input and may bookmark content.

According to an embodiment, in operation 310, the electronic device 100 (e.g., a processor 150 of FIG. 2) may receive a user input for bookmarking output content. The electronic device 100 may execute an application to receive the user input.

According to an embodiment, in operation 320, the electronic device 100 may store bookmark information of the bookmarked content. The bookmark information may include, for example, title information, image information included in the content, sound information included in the content, thumbnail information of the content, or the like.

According to an embodiment, in operation 330, the electronic device 100 may transmit the stored bookmark information to an external server 300. The external server 300 may receive additional information associated with content using the received bookmark information.

Figure 4:
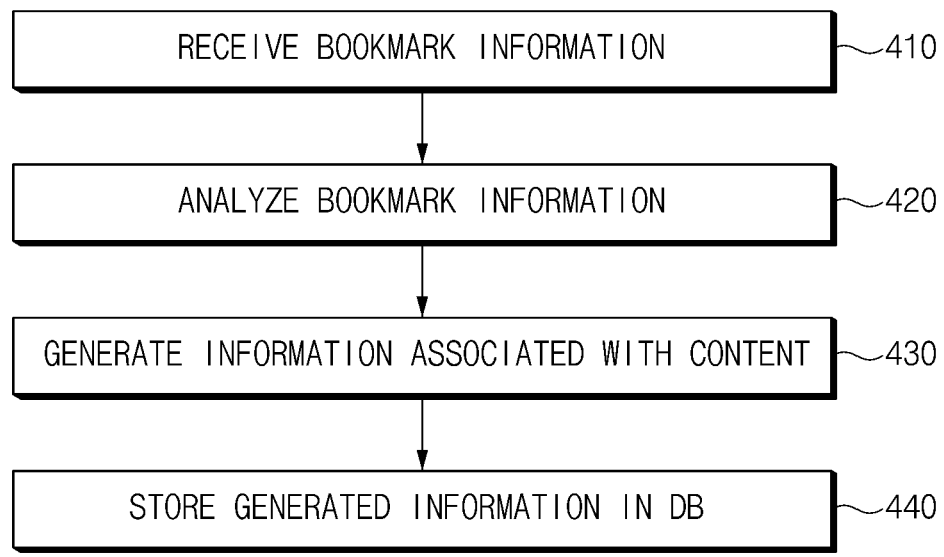
FIG. 4 is a flowchart illustrating a method for generating information associated with bookmark information in an external server according to an embodiment.

FIG. 4 is a flowchart illustrating a method for generating information associated with bookmark information in an external server according to an embodiment.

According to an embodiment, an external server 300 may obtain information associated with received bookmark information.

According to an embodiment, in operation 410, the external server 300 may receive bookmark information from an electronic device 100.

According to an embodiment, in operation 420, the external server 300 may analyze the received bookmark information. For example, the external server 300 may analyze at least one of an image and a sound included in the content. For another example, the external server 300 may analyze metal information included in the bookmark information.

According to an embodiment, in operation 430, the external server 300 may obtain information associated with content corresponding to the bookmark information. Information associated with the bookmark information may include, for example, channel information of a channel broadcasting content and additional information (e.g., information about a product, a place, music, or the like) associated with the content.

According to an embodiment, in operation 440, the external server 300 may store the obtained information in a database. When receiving a request to receive information associated with content from the electronic device 100, the external server 300 may transmit information stored in the database to the electronic device 100.

Figure 5:
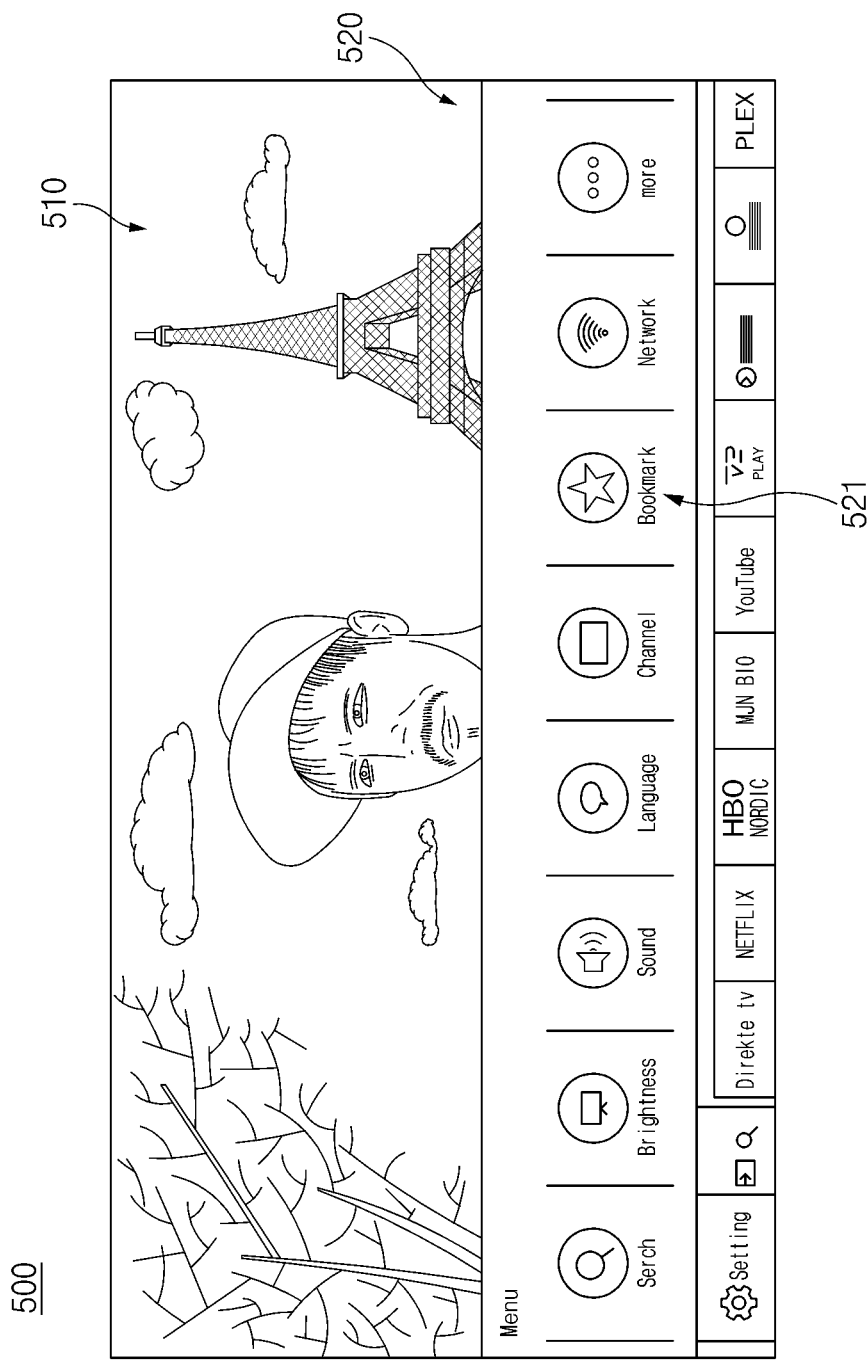
FIGS. 5 and 6 are drawings illustrating screens where a display device executes an application and generates bookmark information according to an embodiment.
Figure 6:
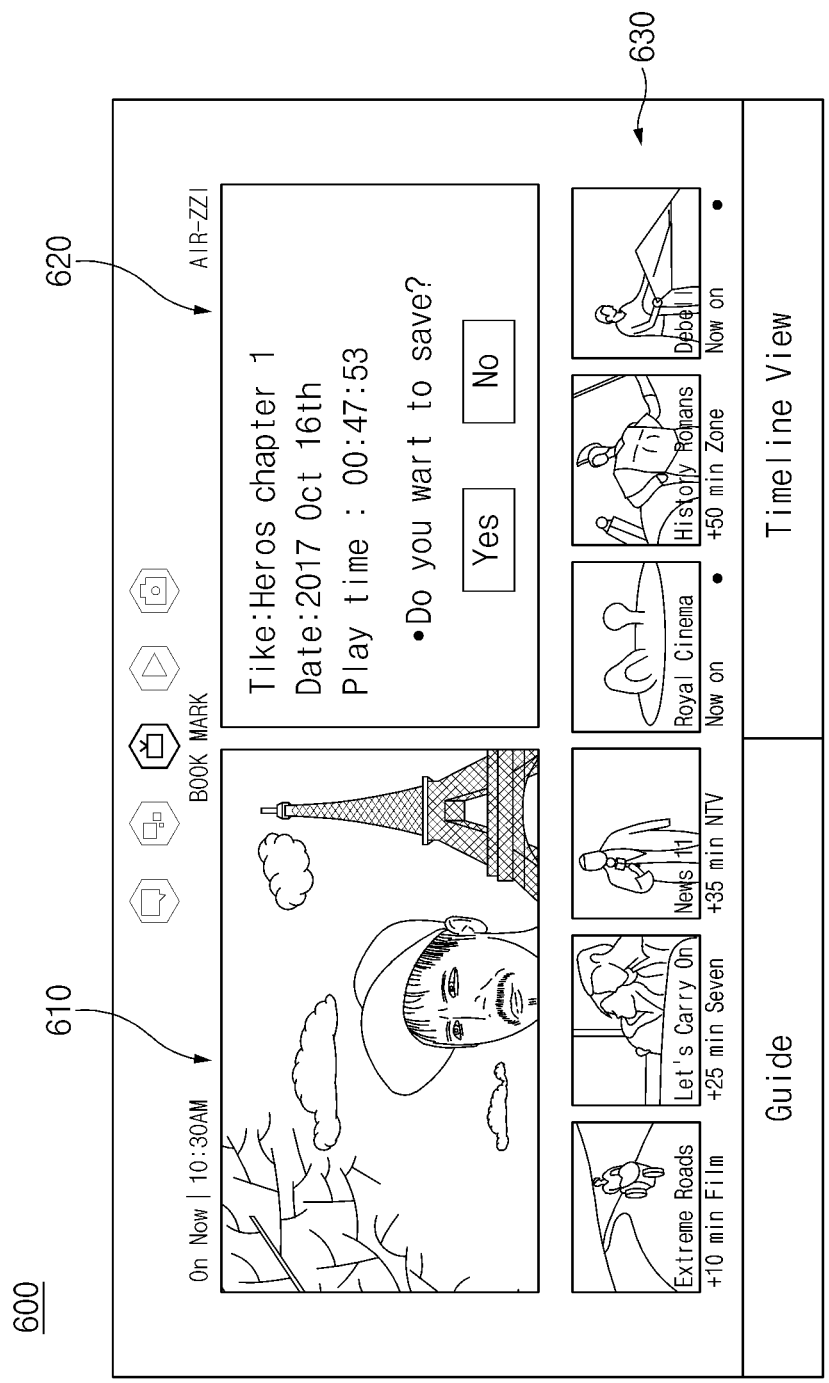

FIGS. 5 and 6 are drawings illustrating screens where a display device executes an application and generates bookmark information according to an embodiment.

Referring to FIG. 5, an electronic device 100 (e.g., a display device) may receive a user input for bookmarking output content.

According to an embodiment, the electronic device 100 may display an image 510 included in content on a display 500. According to an embodiment, the electronic device 100 may display a user interface (UI) 520 for selecting a function to be executed on the display 500. The UI 520 for selecting the function to be executed may include a menu 521 for executing a function of bookmarking output content.

According to an embodiment, the electronic device 100 may receive a user input for selecting the menu 521 for executing the function of bookmarking the content. According to an embodiment, when receiving the user input, the electronic device 100 may execute an application for bookmarking content.

Referring to FIG. 6, the electronic device 100 (e.g., the display device) may bookmark content through the executed application.

According to an embodiment, the electronic device 100 may display a UI of an application associated with bookmark information on a display 600. The UI of the application may display an image (e.g., a video image) 610 of output content, information 620 about the output content, and indicators (e.g., an icon) indicating another bookmarked content. According to an embodiment, the electronic device 100 may receive a user input for bookmarking content output through an executed application. According to an embodiment, the electronic device 100 may store bookmark information of content corresponding to a user input.

Figure 7:
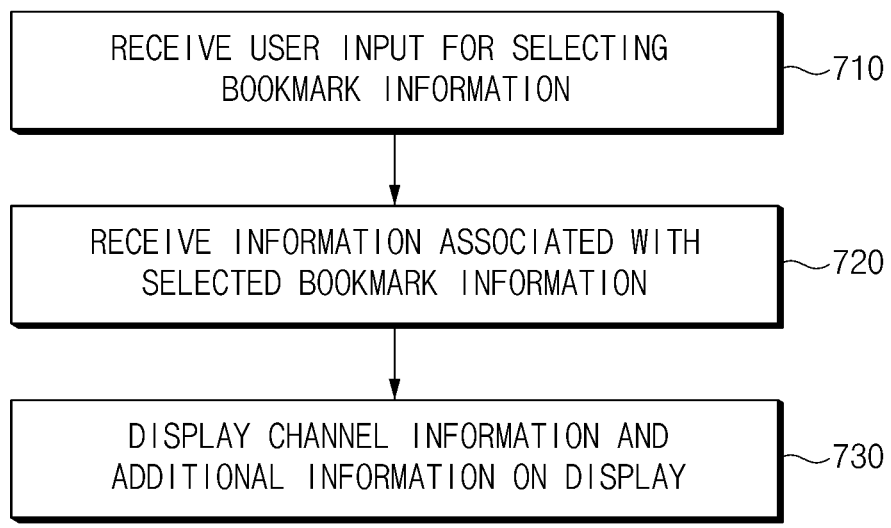
FIG. 7 is a flowchart illustrating a method for providing a user with information associated with selected bookmark information in a display device according to an embodiment.

FIG. 7 is a flowchart illustrating a method for providing a user with information associated with selected bookmark information in a display device according to an embodiment.

Referring to FIG. 7, an electronic device 100 may provide a user with information associated with selected content.

According to an embodiment, in operation 710, the electronic device 100 (e.g., a processor 150) may receive a user input for selecting stored bookmark information.

According to an embodiment, in operation 720, the electronic device 100 may receive information associated with the selected bookmark information from an external server 300. The information associated with the bookmark information may include, for example, channel information and additional information (e.g., product information, music information, or the like) associated with content.

According to an embodiment, in operation 730, the electronic device 100 may output the channel information and the additional information via an output interface 140. For example, the electronic device 100 may display the channel information and the additional information on its display.

FIGS. 8 to 11 are drawings illustrating screens where a display device provides a user with information associated with bookmark information selected through an executed application according to an embodiment.

Figure 8:
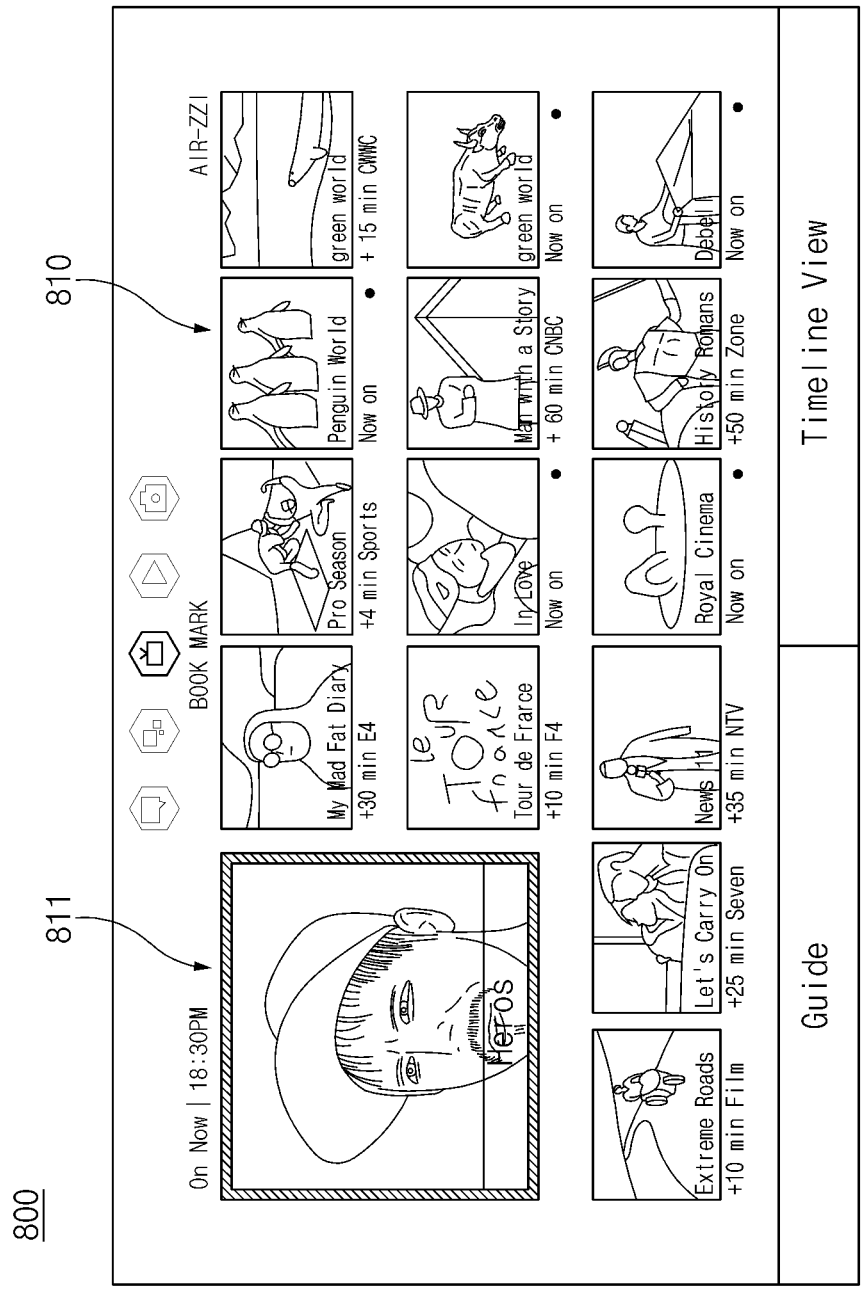
FIGS. 8, 9, 10, and 11 are drawings illustrating screens where a display device provides a user with information associated with bookmark information selected through an executed application according to an embodiment.

Referring to FIG. 8, an electronic device 100 (e.g., a display device) may execute an application for selecting stored bookmark information.

According to an embodiment, the electronic device 100 may display a UI of the application associated with the bookmark information on a display 800. The UI of the application may include indicators (e.g., an icon) 810 indicating bookmarked content. According to an embodiment, the electronic device 100 may receive a user input for selecting at least one of the indicators 810 indicating the bookmarked content and may display an indicator 811 corresponding to the received user input on the display 800.

Figure 9:
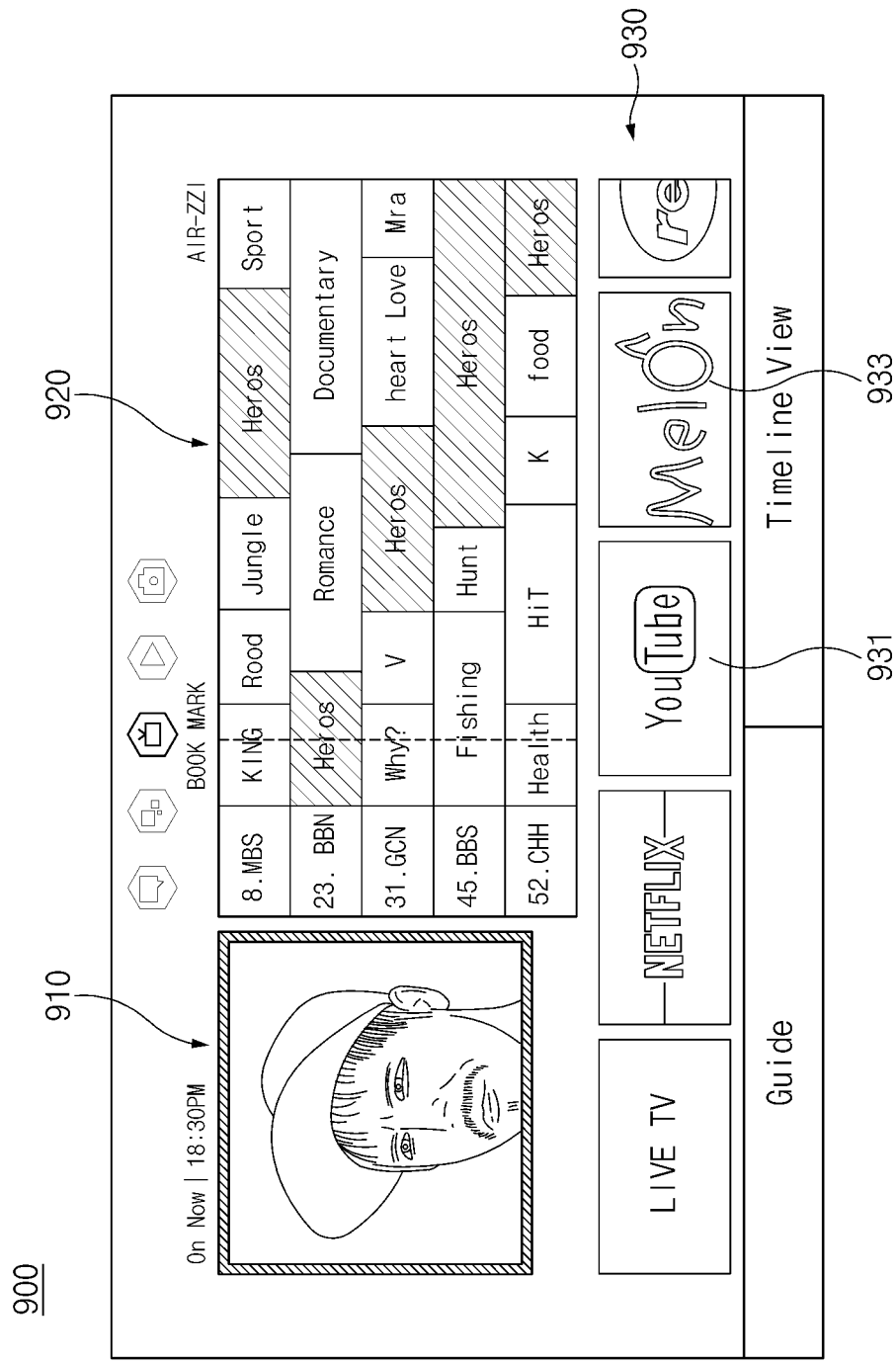

Referring to FIG. 9, the electronic device 100 may provide a user with channel information associated with content corresponding to selected bookmark information.

According to an embodiment, the electronic device 100 may display an indicator 910 of the selected bookmark information on a display 900. According to an embodiment, the electronic device 100 may display channel information 920 of a channel broadcasting content corresponding to the selected bookmark information on the display 900. The channel information 920 may include, for example, information about a channel to broadcast content within a specified time, as well as information about a channel broadcasting the selected content in real time. According to an embodiment, when receiving a user input for selecting at least one channel in the channel information 920, the electronic device 100 may provide the user with the content over the selected channel.

According to an embodiment, the electronic device 100 may display a service provider 930 which provides a service associated with content corresponding to selected bookmark information on the display 900. For example, the electronic device 100 may display a provider 931 capable of providing the user with content. For another example, the electronic device 100 may display a provider 933 capable of providing music associated with a sound included in content. According to an embodiment, when receiving an input for selecting the service provider 930, the electronic device 100 may provide the user with a service (e.g., a service of providing content, music, or the like) associated with the content through the selected service provider.

Figure 10:
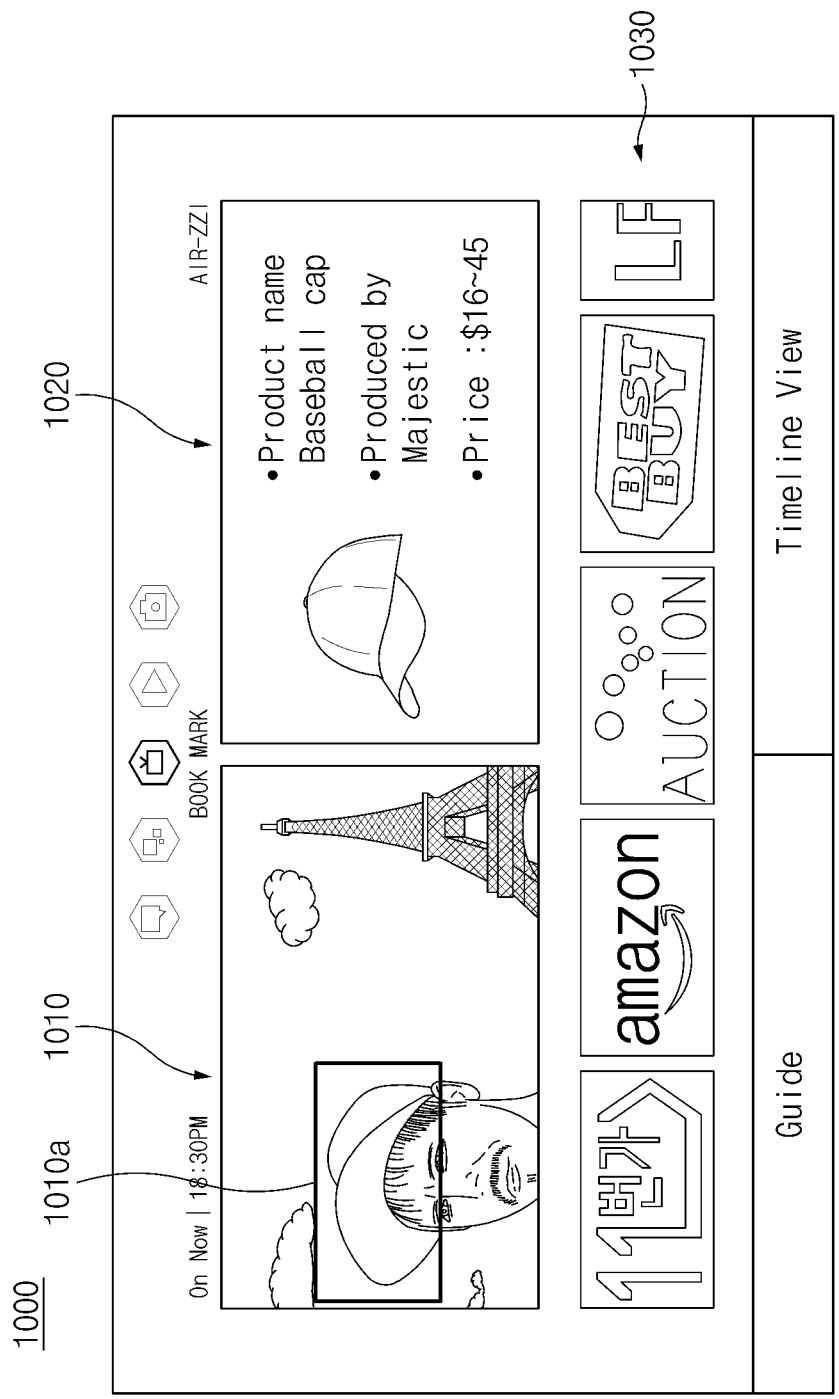

Referring to FIG. 10, the electronic device 100 may provide the user with information about a product included in content corresponding to selected bookmark information.

According to an embodiment, the electronic device 100 may display an image 1010 included in the selected bookmark information on a display 1000. According to an embodiment, the electronic device 100 may display product information 1020 included in content corresponding to the selected bookmark information on the display 1000. The product information 1020 may include, for example, information (e.g., a product name, a manufacturer, or a price) about a product 1010*a* included in the content. According to an embodiment, the electronic device 100 may provide the user with information about a product included in an image before or after a specified time, with respect to a time when a user input for bookmarking content is received.

According to an embodiment, the electronic device 100 may display a seller (e.g., an online seller) 1030 of the product 1010*a* included in content on the display 1000. According to an embodiment, when receiving an input for selecting the seller 1030, the electronic device 100 may provide the user with a product page of the selected seller. The product page may be, for example, a page capable of purchasing the product 1010*a* included in content.

Figure 11:
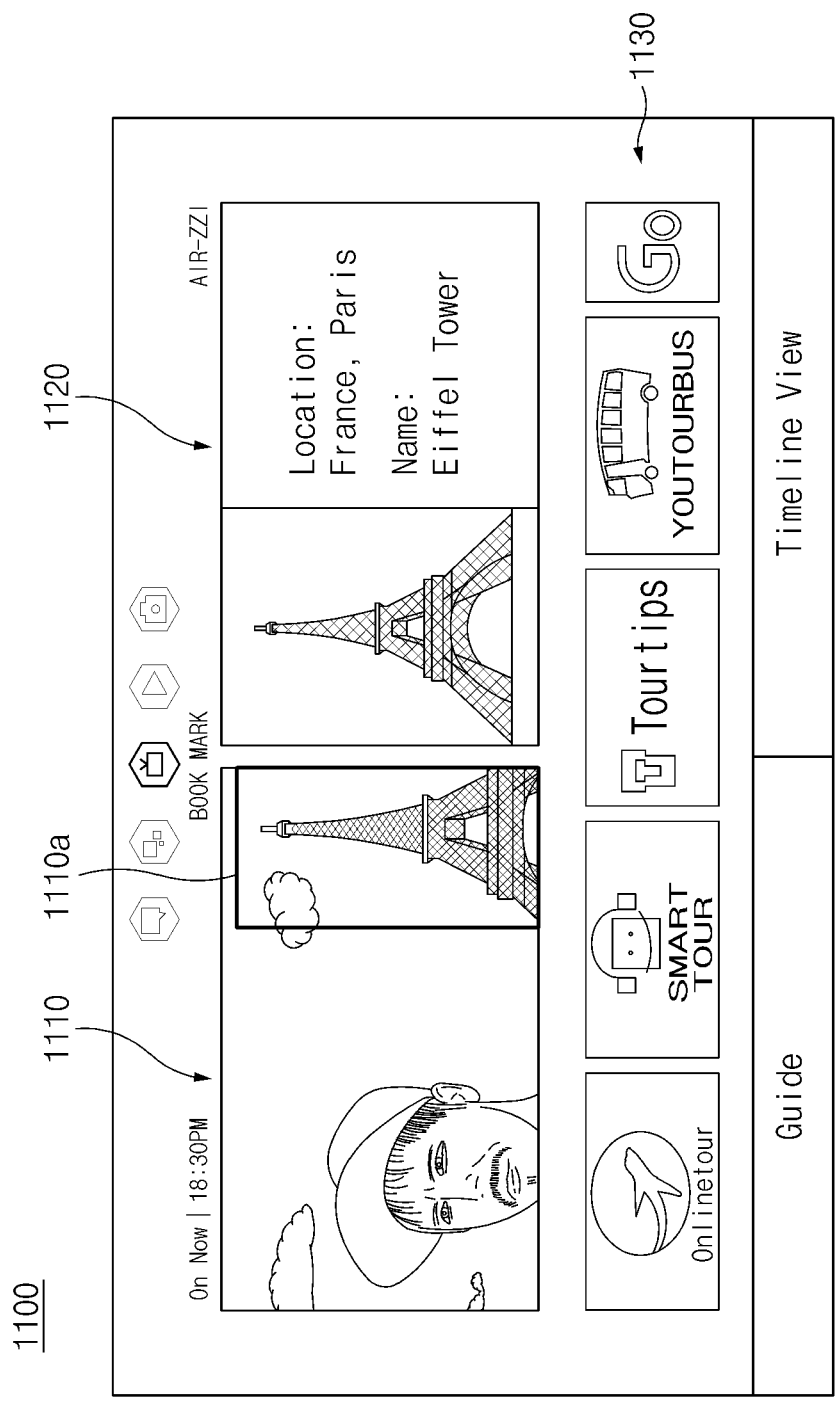

Referring to FIG. 11, the electronic device 100 may provide the user with information about a place included in content corresponding to selected bookmark information.

According to an embodiment, the electronic device 100 may display an image 1110 included in the selected bookmark information on a display 1100. According to an embodiment, the electronic device 100 may display information 1120 about a place included in content corresponding to the selected bookmark information on the display 1100. The information 1120 about the place may include, for example, information (e.g., local information or a place name) about a place 1110*a* included in content. According to an embodiment, the electronic device 100 may provide the user with information about a place included in an image before or after a specified time, with respect to a time when a user input for bookmarking content is received.

According to an embodiment, the electronic device 100 may display a provider 1130 which provides a travel product of the place 1110*a* included in content on the display 1100. According to an embodiment, when receiving a user input for selecting the provider 1130 which provides the travel product, the electronic device 100 may provide the user with a product page of the selected travel product provider. The product page may be, for example, a page capable of reserving the travel product associated with the place 1110a included in the content.

When receiving a user input for selecting bookmarked content, the electronic device according to various embodiments of the disclosure described with reference to FIGS. 1 to 11 may provide channel information of a channel broadcasting the selected content and additional information associated with the content as well as provide the user with specified content, thus implementing a service of actively and quickly providing a variety of information desired by the user.

An electronic device according to an embodiment of the disclosure may include a communication interface for communicating with an external device, an input interface for receiving a user input, a memory storing at least one bookmark information about bookmarked content, an output interface including at least one of a display and a speaker, and a processor electrically connected with the communication interface, the input interface, the memory, and the output interface. The processor may receive a user input for selecting the at least one bookmark information stored in the memory via the input interface and may output channel information of a channel, broadcasting content corresponding to the received user input, via the output interface.

The processor according to an embodiment of the disclosure may receive broadcast information of a plurality of channels from a content transmission device via the communication interface and may obtain channel information of the content corresponding to the user input using the received broadcast information.

The processor according to an embodiment of the disclosure may receive channel information corresponding to the user input from an external server via the communication interface.

The processor according to an embodiment of the disclosure may receive additional information associated with content corresponding to the selected user input from an external server and may output the additional information together with the channel information via the output interface.

The additional information according to an embodiment of the disclosure may be obtained using information analyzed based on at least one of an image and a sound included in the content.

The additional information according to an embodiment of the disclosure may be obtained using meta information included in the content.

The additional information according to an embodiment of the disclosure may include at least one of information about a service provider for playing the content, information about a product included in the content, and information about music included in the content.

The processor according to an embodiment of the disclosure may receive a user input for bookmarking content displayed on the output interface via the input interface, may store bookmark information of the bookmarked content in the memory, and may transmit the bookmark information of the bookmarked content to an external server via the communication interface.

The bookmark information of the bookmarked content according to an embodiment of the disclosure may include title information and thumbnail information.

The memory according to an embodiment of the disclosure may store an application program associated with the bookmark information. The processor may receive the user input from a user through the application program and may provide the user with the channel information through the application program.

A control method of an electronic device according to an embodiment of the disclosure may include receiving a user input for selecting at least one of at least one bookmark information about bookmarked content and outputting channel information of a channel broadcasting content corresponding to the received user input via the output interface.

The outputting of the channel information via the output interface according to an embodiment of the disclosure may include receiving broadcast information of a plurality of channels from a content transmission device, obtaining channel information of the content corresponding to the user input using the received broadcast information, and outputting the obtained channel information via the output interface.

The outputting of the channel information via the output interface according to an embodiment of the disclosure may include receiving the channel information from an external server and outputting the received channel information via the output interface.

The control method of the electronic device according to an embodiment of the disclosure may further include receiving additional information associated with content corresponding to the selected user input from an external server and outputting the additional information together with the channel information via the output interface.

The additional information according to an embodiment of the disclosure may be obtained using information analyzed based on at least one of an image and a sound included in the content.

The additional information according to an embodiment of the disclosure may be obtained using meta information included in the content.

The additional information according to an embodiment of the disclosure may include at least one of information about a service provider for playing the content, information about a product included in the content, and information about music included in the content.

The control method of the electronic device according to an embodiment of the disclosure may further include receiving a user input for bookmarking content displayed on a display via an input interface, storing bookmark information of the bookmarked content in a memory, and transmitting the bookmark information of the bookmarked content to an external server via a communication interface.

The bookmark information of the bookmarked content according to an embodiment of the disclosure may include title information and thumbnail information.

A storage medium according to an embodiment of the disclosure may include a program for performing a method including receiving a user input for selecting at least one of at least one bookmark information and displaying channel information of a channel broadcasting content corresponding to the received user input on a display.

At least a part of an apparatus (e.g., modules or functions thereof) or a method (e.g., operations) according to various embodiments may be, for example, implemented by instructions stored in a computer-readable storage media in the form of a program module. The instruction, when executed by a processor, may cause the one or more processors to perform a function corresponding to the instruction. A computer-readable storage medium may include a hard disk, a floppy disk, a magnetic media (e.g., a magnetic tape), an optical media (e.g., a compact disc read only memory (CD-ROM) and a digital versatile disc (DVD), a magnetooptical media (e.g., a floptical disk), an internal memory, and the like. The instruction may include a code made by a compiler or a code executable by an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device, comprising:
a communication interface configured to communicate with a first external device;
an input interface configured to receive an input;
a memory storing at least one bookmark information including an image for broadcasting content;
an output interface configured to include a display; and
a processor electrically connected with the communication interface, the input interface, the memory, and the output interface,
wherein the processor is configured to:
receive a first input for bookmarking via the input interface while a content is output via the output interface,
store an image of the content output before or after a specified time with respect to a time when the first input for bookmarking is received, as bookmark information,
display a user interface (UI) including at least one bookmark information, and
when a bookmark information is selected from the UI based on a second input received via the input interface, obtain related information associated with an image corresponding to the selected bookmark information by providing the image corresponding to the selected bookmark information to the first external device, and
display the related information via the output interface by receiving the related information from the first external device,
wherein the related information includes at least one of product information associated with at least one product included in the image corresponding to the selected bookmark information and place information associated with a place included in the image corresponding to the selected bookmark information,
wherein the product information includes at least one of a product name, a manufacturer or a price about the at least one product included in the image, and
wherein the place information includes at least one of local information and a place name about the at least one place included in the image.

2. The electronic device of claim 1, wherein the processor is further configured to receive the content from a second external device.

3. The electronic device of claim 1, wherein the processor is further configured to display channel information of a channel broadcasting the content including the image corresponding to the selected bookmark information.

4. The electronic device of claim 3, wherein the processor is further configured to display the channel information with the related information.

5. The electronic device of claim 3, wherein the processor is further configured to display the channel information with an electronic program guide including a list of channels.

6. The electronic device of claim 3, wherein the processor is further configured to, when an input for selecting channel information is received, display the broadcasting content corresponding to the selected channel information.

7. The electronic device of claim 1, wherein the processor is further configured to display information associated with a service provider for the broadcasting content corresponding to the selected bookmark information.

8. A control method of an electronic device, the method comprising:
receiving a first input for bookmarking while a content is output;
storing an image of the content output before or after a specified time with respect to a time when the first input for bookmarking is received, as bookmark information;
displaying a user interface (UI) including at least one bookmark information, wherein the at least one bookmark information includes an image for broadcasting content;
when a bookmark information is selected from the UI based on a second input, obtaining related information associated with an image included in the selected bookmark information by providing the image corresponding to the selected bookmark information to a first external device; and
displaying the related information by receiving the related information from the first external device,
wherein the related information includes at least one of product information associated with at least one product included in the image corresponding to the selected bookmark information and place information associated with a place included in the image corresponding to the selected bookmark information,
wherein the product information includes at least one of a product name, a manufacturer or a price about the at least one product included in the image, and
wherein the place information includes at least one of local information and a place name about the at least one place included in the image.

9. The method of claim 8, further comprising:
receiving the content from a second external device.

10. The method of claim 8, further comprising:
displaying channel information of a channel broadcasting the content including the image corresponding to the selected bookmark information.

11. The method of claim 10, further comprising:
displaying the channel information with the related information.

12. The method of claim 10, further comprising:
displaying the channel information with an electronic program guide including a list of channels.

13. The method of claim 10, further comprising:
when an input for selecting channel information is received, displaying the broadcasting content corresponding the selected channel information.

14. The method of claim 8, further comprising:
displaying information associated with a service provider for the broadcasting content corresponding to the selected bookmark information.

* * * * *